(12) United States Patent
Schlick et al.

(10) Patent No.: US 10,112,236 B2
(45) Date of Patent: Oct. 30, 2018

(54) DEVICE AND METHOD FOR THE MANUFACTURE OR REPAIR OF A THREE-DIMENSIONAL OBJECT

(71) Applicant: MTU Aero Engines AG, Munich (DE)

(72) Inventors: Georg Schlick, Munich (DE); Maximilian Fisser, Tegernsee (DE); Alexander Ladewig, Bad Wiessee (DE); Steffen Schlothauer, Erdweg (DE); Thomas Hess, Munich (DE); Andreas Jakimov, Munich (DE)

(73) Assignee: MTU AERO ENGINES AG, Munich (DE)

(*) Notice: Subject to any disclaimer, the term of this patent is extended or adjusted under 35 U.S.C. 154(b) by 387 days.

(21) Appl. No.: 14/919,569

(22) Filed: Oct. 21, 2015

(65) Prior Publication Data

US 2016/0121398 A1    May 5, 2016

(30) Foreign Application Priority Data

Oct. 30, 2014  (EP) .................... 14191026

(51) Int. Cl.
*B22F 3/105*    (2006.01)
*B28B 1/00*    (2006.01)
(Continued)

(52) U.S. Cl.
CPC ............ *B22F 3/1055* (2013.01); *B28B 1/001* (2013.01); *B22F 2003/1056* (2013.01);
(Continued)

(58) Field of Classification Search
CPC ............ B22F 3/1055; B22F 2003/1056; B22F 2007/068; B22F 2201/01; B29C 64/153; B29C 64/386; B28B 1/001
See application file for complete search history.

(56) References Cited

U.S. PATENT DOCUMENTS 6,583,379 B1 *    6/2003  Meiners ............... B22F 3/1055
                                           219/121.6
2012/0251378 A1*  10/2012  Abe ................... B29C 67/0077
                                           419/55
(Continued)

FOREIGN PATENT DOCUMENTS

DE    10 2009 051 479 A1    5/2011
JP       2016068131 A  *  5/2016    ......... B23K 26/0648
WO    WO-9208592 A1  *  5/1992    ............ B22F 3/1055

*Primary Examiner* — Jacob T Minskey
*Assistant Examiner* — Cedrick S Williams
(74) *Attorney, Agent, or Firm* — Barlow, Josephs & Holmes, Ltd.

(57) ABSTRACT

The invention relates to a device for the manufacture or repair of a three-dimensional object, comprising at least one construction chamber for a successive solidification of at least one solidifiable material layer by the layer in predefined regions for the layer-by-layer buildup of the three-dimensional object or for the layer-by-layer repair of individual regions of the three-dimensional object within the construction chamber, and at least one inlet nozzle and at least one suction nozzle for a process gas, wherein the inlet nozzle and the suction nozzle are arranged in such a way that a gas flow that passes at least partially over a construction platform formed in a construction chamber is created.

11 Claims, 7 Drawing Sheets

(51) Int. Cl.
 *B29K 105/00* (2006.01)
 *B33Y 30/00* (2015.01)
 *B22F 7/06* (2006.01)

(52) U.S. Cl.
 CPC ... *B22F 2007/068* (2013.01); *B29K 2105/251* (2013.01); *B33Y 30/00* (2014.12); *Y02P 10/295* (2015.11)

(56) References Cited

U.S. PATENT DOCUMENTS

2015/0174823 A1* 6/2015 Wiesner ............... B29C 64/153 264/497
2017/0216916 A1* 8/2017 Nyrhila ............... B22F 3/1055

* cited by examiner

DEVICE AND METHOD FOR THE MANUFACTURE OR REPAIR OF A THREE-DIMENSIONAL OBJECT

BACKGROUND OF THE INVENTION

The invention relates to a device for the manufacture or repair of a three-dimensional object in accordance with the present invention. The invention further relates to a suction nozzle and an inlet nozzle for use in a device for the additive manufacture or repair of a three-dimensional object also in accordance with the present invention.

Methods and devices for the manufacture of three-dimensional objects, in particular components, are known in great variety. In particular, additive manufacturing methods (so-called rapid manufacturing or rapid prototyping methods) are known, in which the three-dimensional object or the component is built up layer by layer by means of additive manufacturing methods based on powder beds. Primarily metal components can be manufactured by laser or electron-beam melting or sintering methods, for example. In these processes, at least one powdered component material is deposited initially layer by layer on a component platform in the region of a buildup or joining zone of the device. Subsequently, the component material is locally melted and/or sintered layer by layer by supplying at least one high-energy beam, such as an electron or laser beam, for example, to the component material in the region of the buildup and joining zone. In the process, the control of the high-energy beam depends on information about the layer of each of the component layers being manufactured. After the melting and/or sintering, the component platform is lowered layer by layer by a predefined layer thickness. Afterward, the steps mentioned are repeated until final complete fabrication of the component has occurred. Comparable additive methods are known for the manufacture of ceramic or plastic elements.

Also known from prior art are, in particular, additive manufacturing methods for the manufacture of components of a turbomachine, such as, for example, components of an aircraft engine or a gas turbine—for example, the method described in DE 10 2009 051 479 A1 or a corresponding device for the manufacture of a component of a turbomachine. In this method, a corresponding component is manufactured by deposition of at least one powdered component material layer by layer on a component platform in the region of a buildup and joining zone as well as local melting or sintering of the component material layer by layer through energy supplied in the region of the buildup and joining zone. The energy is supplied in this case via laser beams, such as, for example $CO_2$ lasers, Nd:YAG lasers, Yb fiber lasers as well as diode lasers, or else by electron beams.

The removal of process by-products is usually implemented in the generic devices and methods by a flow of protective gas, which is generally passed over the entire mentioned component platform or a buildup and joining zone. In this case, known devices for the additive fabrication of three-dimensional objects comprise a plurality of inlet nozzles for the protective gas as well as at least one suction nozzle. Used in particular are inlet nozzles that, on the one hand, are arranged laterally above the buildup and joining zone and, on the other hand, are arranged in an upper region of the device that lies opposite the buildup and joining zone. Owing to its geometry and position, the latter-mentioned upper inlet nozzle has a direct influence on the volume flow and the flow field of the flow of protective gas in the construction space or the process chamber above the component platform. In this case, the centered arrangement of the upper inlet nozzle in the upper region of the device can lead to an inhomogeneous flow field and thus to a deficient removal of process by-products. The suction nozzle also has an influence on the flow field of the protective gas. Known geometries of suction nozzles can lead to non-uniform flow rates over the nozzle width. In addition, the flow rate at the suction nozzle is markedly slower in known devices than the flow rate directly after the inlet nozzle. This latter fact is the reason why, in known devices, the sum of the fluid-dynamically relevant cross-sectional areas at the entrances of suction nozzles, that is, the orifices of suction nozzles, is at least three times as large as the sum of the fluid-dynamically relevant cross-sectional areas at the exits or inlet orifices of the upper and lower inlet nozzles. Because, on account of the volume flow and the cross sections of the inlet and suction nozzles, a subsonic flow and thus incompressible flows may be assumed to occur, the ratio of the flow rates at the inlet and outlet nozzles is obtained via the ratios of the mentioned fluid-dynamically relevant cross-sectional areas. The mentioned low flow rates as well as the overall inhomogeneous flow field within the construction spaces of known devices lead to a deficient removal of process by-products. Thus, in known devices for selective laser beam melting, flaws in the process and in the component increasingly occur in certain construction space regions, so that these regions are not suitable for the production of serially manufactured components. These flaws occur, in particular, owing to the mentioned deficient removal of process by-products. The process by-products in selective laser-beam melting can be, in particular, smolder (welding fumes), spatter, ejected material, and dispersed powder. Smolder, in particular, leads to defocusing and shielding of the laser beam. As a result, the energy density that needs to be introduced onto the melting material drops and the powder is melted only deficiently. This leads to deficient bonding to the component, as a result of which, in turn, bonding flaws can occur in the component. In addition, spatter and ejected material lead to a marked local increase in the layer thickness. As a result, in turn, a deficient bonding to the component and bonding flaws can occur.

SUMMARY OF THE INVENTION

The object of the present invention is therefore to create a device of the kind mentioned in the introduction, which ensures an improved removal of process by-products formed in additive manufacturing methods from a region of a buildup and joining zone. In addition, there exists the object of creating a suction nozzle and an inlet nozzle that also ensure an improved removal of process by-products formed in additive manufacturing methods from a region of a buildup and joining zone of a device for the additive manufacture or repair of a three-dimensional object.

This object is achieved according to the invention by a device for the manufacture or repair of a three-dimensional object. In addition, this object is achieved by a suction nozzle and by an inlet nozzle according to the present invention. Advantageous embodiments with appropriate enhancements of the invention are presented in the respective dependent claims, in which advantageous embodiments of the device are to be regarded as advantageous embodiments of the suction nozzle and of the inlet nozzle, and vice versa.

A first aspect of the invention relates to a device for the manufacture or repair of a three-dimensional object, said device comprising at least one construction space or chamber for successive solidification of at least one solidifiable material, layer by layer, in predefined regions for layer-by-layer buildup of a three-dimensional object or for layer-by-layer repair of individual regions of the three-dimensional object within the construction chamber and at least one inlet nozzle as well as at least one suction nozzle for a process gas, with the inlet nozzle and the suction nozzle being arranged in such a way as to create a flow of gas that passes at least partially above a buildup and joining zone of a construction platform, said zone being formed in the construction chamber. In addition, the ratio of the sums of the fluid-dynamically relevant cross-sectional areas of the at least one suction nozzle to the at least one inlet nozzle is 2.5:1 (2.5 to 1) to 0.3:1 (0.3 to 1). However, the ratio of the sums of the fluid-dynamically relevant cross-sectional areas of the at least one suction nozzle to the at least one inlet nozzle can also be 2:1 to 0.5:1, in particular 1.3:1 to 0.7:1. As a result of the marked reduction, in comparison to the prior art, in the ratio of the sums of the fluid-dynamically relevant cross-sectional areas, that is, particularly the ratio of the sums of the areas of the suction orifices of the suction nozzle to the sum of the areas of the inlet orifices of the inlet nozzle, a marked increase in the flow rate of the gas flow in the construction chamber is achieved. This leads to an improvement in the removal of process by-products in the additive manufacture or repair of the three-dimensional object. In addition, a more homogeneous flow field is obtained, which, in turn, contributes to the marked improvement in the removal of process by-products. In particular, the at least one suction nozzle and the at least one inlet nozzle are designed here in such a way that the ratio of the effective flow rates of the at least one suction nozzle to the at least one inlet nozzle is 2.5:1 to 0.3:1. In advantageous embodiments of the invention, the ratio of the effective flow rates of the at least one suction nozzle to the at least one inlet nozzle can also be 2:1 to 0.5:1, in particular 1.3:1 to 0.7:1. The ratio of the sums of the fluid-dynamically relevant cross-sectional areas of the suction nozzles to the inlet nozzles as well as the ratio of the effective flow rates of the suction nozzles to the inlet nozzles is 3:1 (3 to 1) and greater for devices according to the prior art. In addition, the improved removal of process by-products ensures that, for example, a high-energy beam, such as a laser beam, is no longer shielded and defocused by the process by-products that form. This leads to a marked improvement in quality in the manufacture or repair of the three-dimensional object. The process gas used is, in particular, a protective or inert gas. According to the invention, the volume flow of the process gas within the construction chamber is 10 to 200 $m^3/h$, in particular 30 to 150 $m^3/h$ or 50 to 80 $m^3/h$. According to the invention, the flow rates directly after the inlet nozzle and in front of the suction nozzle are 0.5 to 10 m/s, in particular 1.0 to 8.0 m/s or 2.0 to 4.0 m/s. Such volume flows and flow rates are achieved according to the invention by the design of the fluid-dynamically relevant cross-sectional areas of the suction nozzle and the inlet nozzle and, in particular, by the ratio of the sums of the fluid-dynamically relevant cross-sectional areas. In particular, suction nozzles that, in comparison to conventional suction nozzles, have markedly smaller cross-sectional areas of the suction orifices are provided. Thus, for example, a reduction in the mentioned cross-sectional area by approximately 66% can occur, as a result of which the flow rate at the suction is increased by about threefold. The flow rate at the suction nozzles is thus brought to approach and match the flow rate at the inlet nozzles. The construction chamber of the device described in the preceding discussion is usually a process chamber for carrying out the additive manufacture or repair method. The three-dimensional object to be manufactured or repaired is a component or a component region of an aircraft engine, in particular a compressor or a turbine. The material used can be in the form of a powder, liquid, or paste and usually is composed of a metal, a metal alloy, a ceramic or plastic, or a mixture thereof.

In other advantageous embodiments of the device according to the invention, the suction nozzle comprises at least one suction orifice, which is connected to an associated suction channel in such a way as to carry the flow, with the flow channel having wall surfaces that, in the flow direction, have a contoured course that is curved at least in sections. The avoidance of corners and edges within the flow channel results, in turn, in an increase in the flow rate, because the flow resistance within the flow channel is markedly reduced by the curved contoured course of the wall surfaces, that is, the corresponding roundings thereof. Furthermore, there exists the possibility that the suction nozzle comprises at least two suction orifices, with the associated suction channels being separated from one another at least in sections. In this case, the suction channels are designed and dimensioned in such a way that a roughly equivalent gas volume flow passes through each suction channel. This measure also results, on the one hand, in an increased flow rate in the flow channels and, on the other hand, in a more homogeneous flow field in the construction chamber of the device. Furthermore, there exists the possibility that the suction channel is designed in such a way that the suctioned gas flow is diverted in a plane above and/or below the suction orifice. For this purpose, the flow is carried after the inlet into the suction channel first upward and/or downward and then to the side. This advantageous embodiment results in a more compact construction design of the suction nozzle, which leads overall to a simplification in the design of the device. Furthermore, there exists the possibility that the suction nozzle comprises a plurality of suction orifices, with at least one cover being arranged on a subregion of the suction orifices in order to reduce the fluid-dynamically relevant cross-sectional area. In this case, the cover can be designed as a separate component, although it is also possible to cover the mentioned subregion of the suction orifices with a corresponding adhesive film. All in all, the design of the suction nozzles according to the invention results in a marked reduction in the sum of the fluid-dynamically relevant cross-sectional areas, in particular the area of the corresponding suction orifices of the suction nozzle. The design of the suction nozzles according to the invention results in a marked increase in the flow rate of the gas flow at the suction, so that process by-products formed in the construction chamber of the device can be removed in a straightforward manner.

In other advantageous embodiments of the device according to the invention, the device comprises at least one upper inlet nozzle arranged in an upper region lying opposite the construction platform and/or in a side wall of the device, and/or at least one lower inlet nozzle arranged in a side wall of the device above the construction platform and below the upper inlet nozzle. Depending on the volume of the construction chamber, the inlet nozzles can be arranged advantageously in different regions and also in a requisite number for achieving a corresponding flow volume of the process gas. In this case, the upper inlet nozzle can comprise at least two inlet orifices, with the inlet orifices being separated by at least one separator wall. The incoming gas flow of the process gas is divided in the inlet nozzle and carried into the individual inlet channels. In this case, the division of the gas flow can occur, for example, by horizontally and/or vertically arranged separator walls. In addition, the inlet channels can be designed in such a way that the outflow rate is the same at each point of the inlet nozzle. In this case, the nozzle width is chosen advantageously in such a way that it leads to a flow field of the process gas that is distributed homogeneously on the entire construction platform. This results overall in an improvement in the homogeneity of the flow field of the process gas within the construction chamber and, in particular, above the construction platform of the device. In another advantageous embodiment of the upper inlet nozzle, it comprises at least one passage opening for a high-energy beam, in particular a laser beam or electron beam, or a light beam, in particular a UV light beam. In this case, the flow of the process gas is, in turn, divided in the inlet nozzle by separator walls and diverted in the direction of the construction platform. In particular, in a lateral arrangement of the upper inlet nozzle, the gas flow is diverted by approximately 90° downward in the direction of the construction platform. Such an embodiment of the upper inlet nozzle makes possible, in turn, an overall compact design of the device.

In other advantageous embodiments of the device according to the invention, the material is in the form of a powder, liquid, or paste and is composed of a metal, a metal alloy, a ceramic or plastic, or a mixture thereof. However, it is also possible to use other, solidifiable materials within the device according to the invention for the manufacture or repair of a three-dimensional object. The three-dimensional object can be, in particular, a component or a component region of an aircraft engine, in particular a compressor or a turbine.

A second aspect of the invention relates to a suction nozzle for use in a device for the additive manufacture or repair of a three-dimensional object, said suction nozzle comprising at least one suction orifice and said suction orifice being connected to an associated suction channel in such a way as to carry the flow, and the flow channel having wall surfaces that exhibit a contoured course that is curved at least in sections in the flow direction. The avoidance of corners and edges within the flow channel results in an increase in the flow rate, because the flow resistance within the flow channel is markedly reduced by the curved contoured course of the wall surfaces, that is, by corresponding roundings. Owing to the marked increase in the flow rate, the flow rate of the gas flow in a construction chamber of the device for additive manufacture or repair of a three-dimensional object is also achieved. This results in an improvement in the removal of process by-products in the additive manufacture or repair of the three-dimensional object. Furthermore, there exists the possibility that the suction nozzle comprises at least two suction orifices, with the associated suction channels being separated from one another at least in sections. In this case, the suction channels can be designed and dimensioned in such a way that a roughly equal gas volume flow passes through each suction channel. This measure also results, on the one hand, in an increased flow rate in the flow channels and, on the other hand, in a more homogeneous flow field in the construction chamber of the device. Furthermore, there exists the possibility that the suction channel is designed in such a way that the suctioned gas flow is diverted in a plane above and/or below the suction orifice. For this purpose, the flow is carried after the inlet into the suction channel first upward and/or downward and then to the side. This advantageous embodiment results in a more compact construction design of the suction nozzle, which leads overall to a simplification in the design of the device. Furthermore, there exists the possibility that the suction nozzle comprises a plurality of suction orifices, with at least one cover being arranged on a subregion of the suction orifices in order to reduce a fluid-dynamically relevant cross-sectional area. In this case, the cover can be designed as a separate component, although it is also possible to cover the mentioned subregion of the suction orifices with a corresponding adhesive film. All in all, the design of the suction nozzles according to the invention results in a marked reduction in the sum of the fluid-dynamically relevant cross-sectional areas, in particular the area of the corresponding suction orifices of the suction nozzle. The embodiment of the suction nozzles according to the invention results in a marked increase in the flow rate of the gas flow at the suction, so that process by-products formed in the construction chamber of the device can be removed in a straightforward manner. The features and advantages ensuing from the use of the device according to the first aspect of the invention may be taken from the descriptions of the first aspect of the invention, whereby advantageous embodiments of the first aspect of the invention are to be regarded as advantageous embodiments of the second aspect of the invention, and vice versa.

A third aspect of the invention relates to an inlet nozzle for use in a device for the additive manufacture or repair of a three-dimensional object, said inlet nozzle comprising at least two inlet orifices and the inlet orifices being separated from each other by at least one separator wall. According to the invention, an incoming gas flow of a process gas is divided in the inlet nozzle and carried into individual inlet channels. In this case, the division of the gas flow can occur, for example, by horizontally and/or vertically arranged separator walls. In addition, the inlet channels can be designed in such a way that the outflow rate is the same at each point of the inlet nozzle. In this case, the nozzle width is chosen advantageously in such a way that it leads to flow field of the process gas that is distributed homogeneously on an entire construction platform of the device for the additive manufacture or repair of a three-dimensional object. This results overall in an improvement in the homogeneity of the flow field of the process gas within the construction chamber and, in particular, above the construction platform of the device. In another advantageous embodiment of the upper inlet nozzle, it comprises at least one passage opening for a high-energy beam, in particular a laser beam or electron beam, or a light beam, in particular a UV light beam. In this case, the flow of the process gas is, in turn, divided in the inlet nozzle by separator walls and diverted in the direction of the construction platform. In particular, in a lateral arrangement of the upper inlet nozzle, the gas flow is diverted by approximately 90° downward in the direction of the construction platform. Such an embodiment of the upper inlet nozzle makes possible, in turn, an overall compact design of the device. The embodiment of the inlet nozzle according to the invention results in a marked improvement in the homogeneity of the flow field of the process gas above the construction platform in the construction chamber, so that process by-products that are formed in the construction chamber of the device can be removed uniformly in a straightforward manner.

Furthermore, there exist the possibilities that the at least one inlet nozzle is arranged in an upper region lying opposite the construction platform and/or in a side wall of the device. The features and advantages ensuing from the use of the device according to the first aspect of the invention may be taken from the descriptions of the first aspect of the invention, whereby advantageous embodiments of the first aspect of the invention are to be regarded as advantageous embodiments of the third as well as the second aspect of the invention, and vice versa.

Further features of the invention ensue from the claims and the exemplary embodiments as well as on the basis of the drawings. The features and combinations of features mentioned above in the description as well as the features and combinations of features mentioned below in the exemplary embodiments can be used not only in the respectively given combinations, but also in other combinations, without departing from the scope of the invention.

BRIEF DESCRIPTION OF THE DRAWING FIGURES

Shown are.

DETAILED DESCRIPTION OF THE INVENTION

Figure 1:
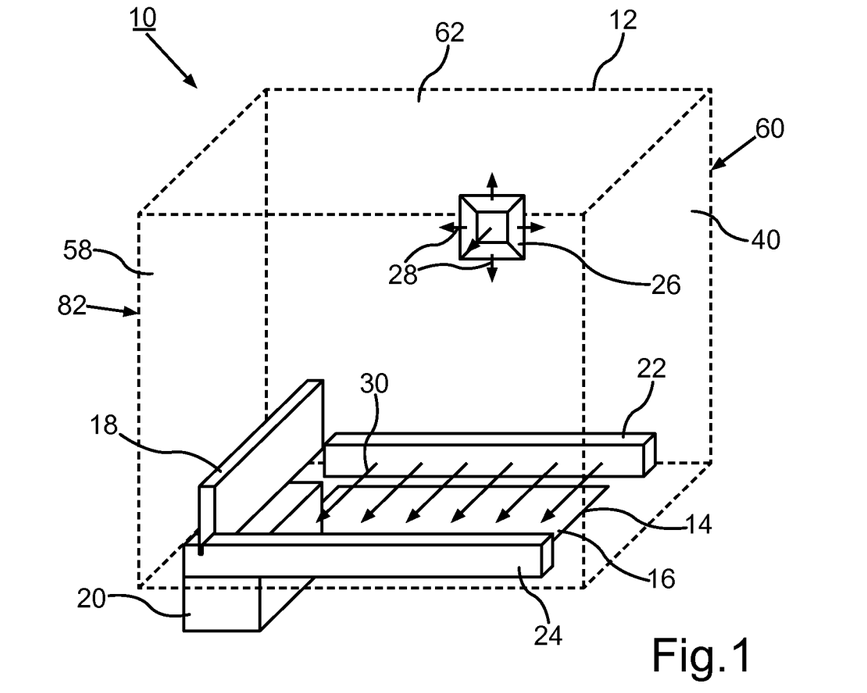
FIG. 1 a schematic illustration of a device according to the invention for the manufacture or repair of a three-dimensional object.

FIG. 1 shows a schematically illustrated device 10 for the additive manufacture or additive repair of a three-dimensional object (not depicted). The three-dimensional object can be, for example, a component of a turbomachine. In particular, it can be a component of a turbine or a compressor of an aircraft engine. In this case, the device 10 has a coating device 18 for the application of at least one powder layer of a component material onto at least one buildup and joining zone 16 of a construction platform 14 that can be lowered. The coating device 18 can travel by means of a travel unit (not depicted) within a construction chamber 12 of the device 10. In this case, the movement of the coating device 18 occurs above and along the construction platform 14 or the buildup and joining zone 16, so that a uniform deposition of the powdered component material layer by layer onto the construction platform 14 is possible.

The component material (not depicted) is in the form of a powder in the exemplary embodiment described. In particular, it is a powder composed of a metal or a metal alloy. However, there also exists the possibility that, in other exemplary embodiments, other materials, such as, for example, ceramic or plastic or a mixture of metal, metal alloy, ceramic, or plastic, is used. In addition, there exists the possibility that the material is not only in the form of a powder, but rather can be in the form of a paste or liquid. If need be, when such component materials are used, other application methods by means of the coating device are employed.

The device 10 further comprises at least one radiation source (not depicted) for generating a high-energy beam 46 (see also FIG. 10), by means of which the powder layer can be locally melted and/or sintered, with formation of a melt bath, to form a component layer in the region of the buildup and joining zone 16. In the illustrated exemplary embodiment the high-energy beam 46 involves a laser beam. However, it is also conceivable to use electron beams or, in addition to high-energy beams, also light beams, in particular UV light beams. Furthermore, the device 10 comprises two inlet nozzles 22, 26. A process gas is carried into the construction chamber 12 or the process chamber of the device 10 via the inlet nozzles 22, 26. The process gas is, in particular, a protective or inert gas. In the illustrated exemplary embodiment, the device 10 comprises an upper inlet nozzle 26 and a lower inlet nozzle 22 positioned below, that is, closer to, the construction platform 14. The lower inlet nozzle 22 is designed as an inlet manifold having a plurality of inlet orifices (not depicted) and is arranged, like the upper inlet nozzle 26, on a laterally formed side wall or back wall 60 of the construction chamber 12. The possible embodiments of the upper inlet nozzle 26 are illustrated in FIGS. 6 to 11. In addition, the device 10 comprises at least one suction nozzle 24 for suctioning off the process gas. The suction nozzle 24 is designed as a suction manifold with a plurality of suction orifices 32 (see also FIGS. 2b, 3b, and 4). The possible embodiments of the suction nozzles 24 are illustrated in FIGS. 2b, 3b, 4, and 5. Created between the lower inlet nozzle 22 and the inlet nozzle 24 is a gas flow 30 that passes at least partially over the construction platform 14 and the buildup and joining zone 16. In this case, the lower inlet nozzle 22 and the suction nozzle 24 are arranged at roughly the same height above the construction platform 14 and the buildup and joining zone 16. Created between the upper inlet nozzle 26 and the suction nozzle 24 is likewise a gas flow 28 that passes at least partially over the construction platform 14 and the buildup and joining zone 16. The construction chamber 12 is delimited by side walls 40, 82, a front wall 58, and a back wall 60, as well as an upper end wall 62.

Furthermore, it is seen that an overflow container 20 for receiving excess material is arranged next to the construction platform 14. In this case, the excess material is brought from the construction platform 14 into the overflow container 20 by means of the coating device 18 or a blade (not depicted) arranged on the coating device 18.

The ratio of the sums of the fluid-dynamically relevant cross-sectional areas of the suction nozzle 24 to the inlet nozzles 22, 26 is 2.5:1 to 0.3:1. This is achieved via a marked reduction in the sum of the fluid-dynamically relevant cross-sectional areas, namely the suction orifices 32 of the suction nozzle 24. In addition, such an embodiment of the suction nozzle 24 results in a ratio of the effective flow rates of the suction nozzle 24 to the inlet nozzles 22, 26 of 2.5:1 to 0.3 to 1.

Figure 2A:
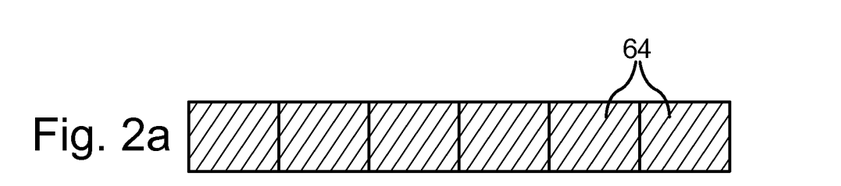
FIG. 2a a schematic illustration of a suction nozzle according to the prior art.
Figure 2B:
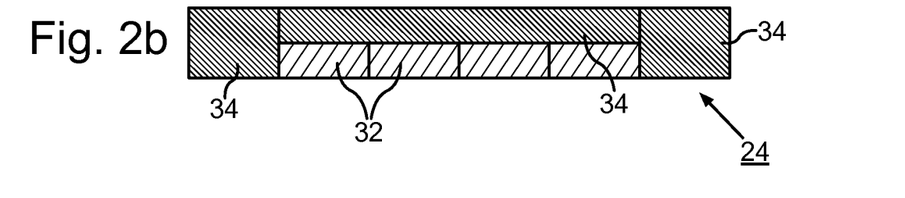
FIG. 2b a schematic illustration of a suction nozzle according to a first embodiment for use in the device according to the invention.

FIG. 2a shows a schematic illustration of a suction nozzle according to the prior art. The design as well as the area of the suction orifices 64 are seen. Schematically illustrated in comparison to this in FIG. 2b is the suction nozzle 24 according to a first embodiment for use in the device 10. It is seen that the suction nozzle 24 comprises a plurality of suction orifices 32, with a subregion of the suction orifices 32 being closed by means of the covers 34. In the illustrated exemplary embodiment, the covers 34 are composed of an adhesive film, for example. The at least partial covering of the suction orifices 32 results, in comparison to the suction nozzle illustrated in FIG. 2a according to the prior art, in a marked reduction in the fluid-dynamically relevant cross-sectional area of the suction nozzle 24. In the illustrated exemplary embodiment, approximately 66% of the original suction orifices 64 are covered, so that there results a roughly threefold increase in the flow rate at the suction. In comparison to the known suction nozzle illustrated in FIG. 2a, the two outer suction orifices 32 as well as one-half of each of the four inner suction orifices 32 are covered in the suction nozzle 24 illustrated in FIG. 2b.

Figure 3A:
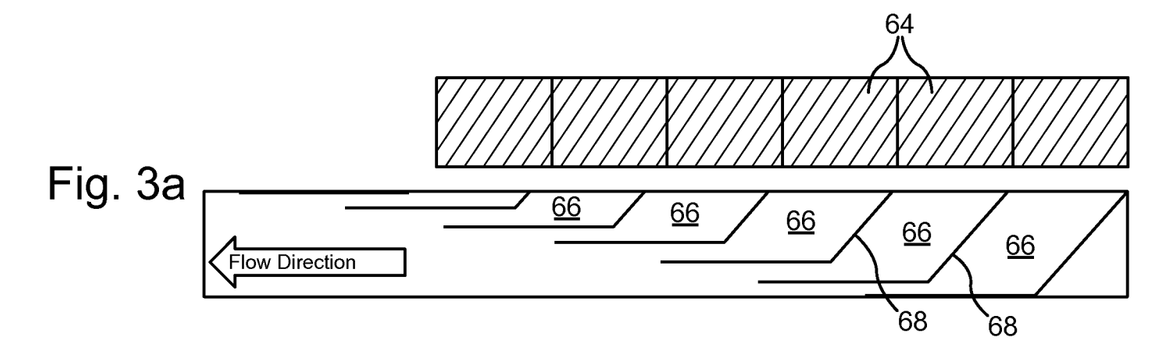
FIG. 3a a schematic illustration of a suction nozzle according to the prior art.

FIG. 3a shows a schematic illustration of the suction nozzle according to the prior art illustrated in FIG. 2a, in which, in addition, a schematically illustrated and cut-away plan view is illustrated. It is seen that the suction orifices 64 are connected to corresponding flow channels 66 in such a way as to carry the flow. In this case, the walls 68 forming the flow channels 66 exhibit a course that is at least partially angular or bent.

Figure 3B:
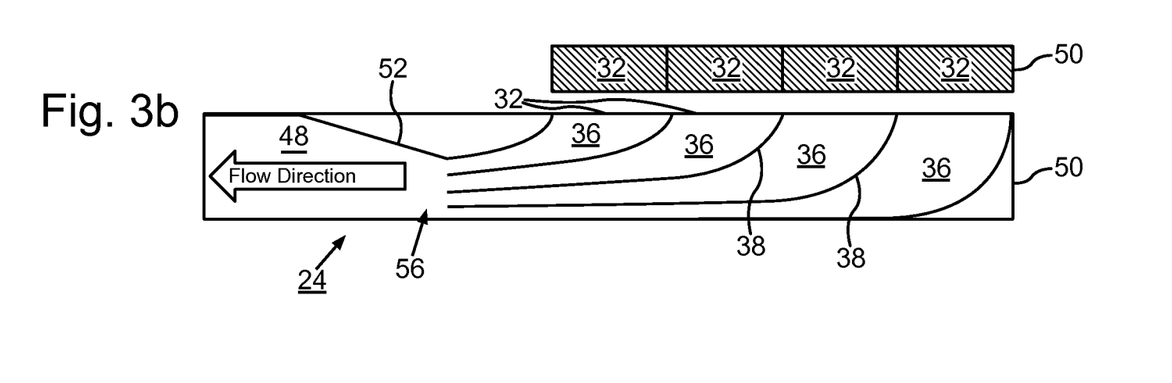
FIG. 3b a schematic illustration of a suction nozzle according to a second embodiment for use in the device according to the invention.

In contrast to this, FIG. 3b shows, in a schematic illustration, the suction nozzle 24 according to a second embodiment for use in the device 10. Initially evident is the reduced cross-sectional areas of the suction orifices 32 in comparison to the known suction nozzle according to FIG. 3a. In addition, it is clear in the schematically illustrated and cut-away plan view of the suction nozzle 24, which is likewise appended, that flow channels 36 are formed, in turn, within a casing 50 of the suction nozzle 24, and said flow channels are connected to the corresponding suction orifices 32 in such a way as to carry the flow. In this case, the flow channels 36 are formed by wall surfaces 38 and separated from one another, with the wall surfaces 38 having a contoured course that is curved at least in sections in the flow direction. In contrast to the walls 68 shown in FIG. 3a, the wall surfaces 38 are not bent and do not exhibit any corresponding corner regions. The wall surfaces 38 exhibit a rounded course, which leads to a marked reduction of the flow resistance within the flow channels 36. In the illustrated exemplary embodiment, the flow channels 36 terminate in a flow channel 48 that is common at their channel ends 56. The flow direction of the process gas is indicated by the arrow. The suction channels 36 are designed and dimensioned in such a way that a roughly equivalent gas volume flow passes through each suction channel 36. In addition, the common flow channel 48 widens at the channel ends 56, so that the gas flows can pass uniformly out of the individual flow channels 36. A kind of funnel-shaped widening is achieved starting from the channel ends 56 by a correspondingly positioned channel wall 52.

Figure 4:
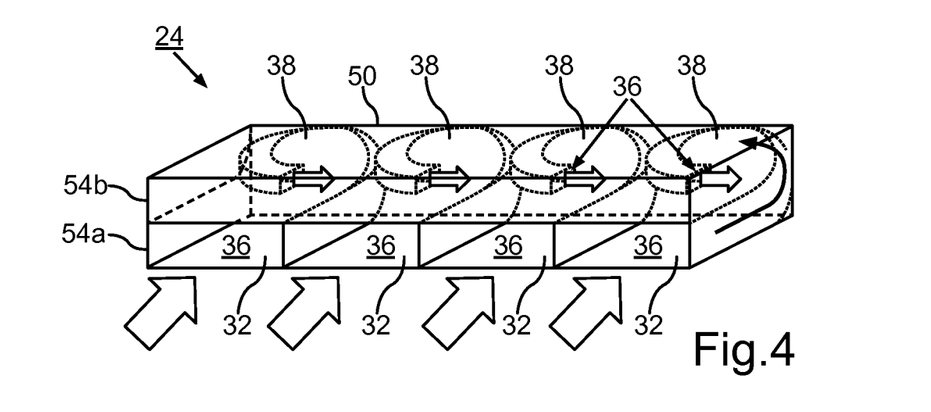
FIG. 4 a schematic illustration of a suction nozzle according to a third embodiment for use in the device according to the invention.

FIG. 4 shows a schematic illustration of a suction nozzle 24 according to a third embodiment for use in the device 10. Evident again is the design of the suction orifices 32, which are connected to corresponding flow channels 36 in such a way as to carry the flow. The flow direction of the gas flow is indicated by the arrows. Furthermore, it is seen that the suction channels 36 are designed in such a way that the suctioned gas flow is carried in a plane above the suction orifices 32. The suction orifices 32 are designed with a smaller cross-sectional area in comparison to the known suction nozzles. The flow channels 36 are once again formed by wall surfaces 38, which exhibit a contoured course that is curved at least in sections in the flow direction. The casing 50 of the suction nozzle 24 is divided into a lower casing section 54a and an upper casing section 54b in the illustrated exemplary embodiment, with the suction channel 36 being passed from the lower casing section 54a into the upper casing section 54b. The suction nozzle 24 shown is compact in design.

Figure 5:
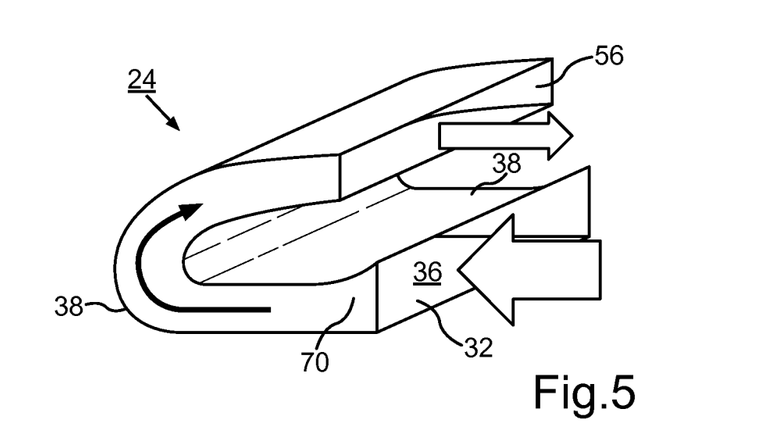
FIG. 5 a schematic illustration of a suction nozzle according to a fourth embodiment for use in the device according to the invention.

FIG. 5 shows a schematic illustration of a suction nozzle 24 according to a fourth embodiment for use in the device 10. It is seen in this illustration that only one flow channel 36 of a suction orifice 32 is illustrated, with the design of the flow channel 36 corresponding generally to the design of the flow channel 36 according to FIG. 4. In contrast to the embodiment illustrated in FIG. 4, the suction nozzle shown here has a funnel-shaped inlet 70 in the region in the flow direction behind the suction orifice 32. The flow direction of the gas flow is illustrated here, too, by the black arrows. It is clear that, for this suction nozzle 24, the gas flow is carried initially upward into a plane above the suction orifice 32 in this case as well.

Figure 6:
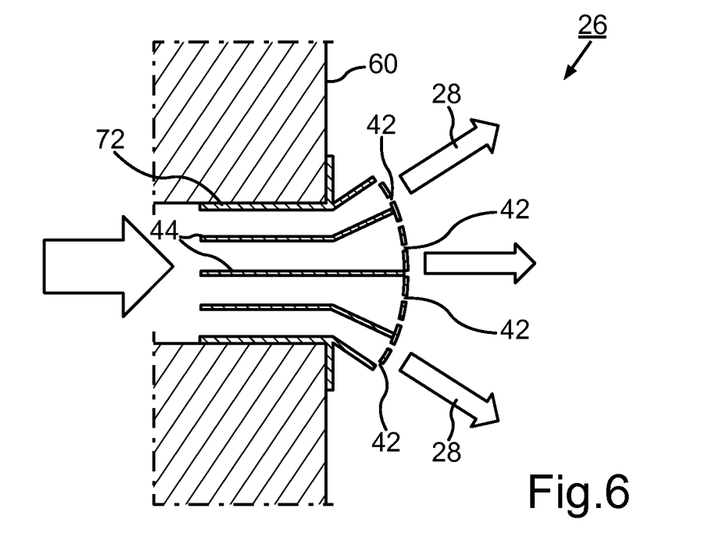
FIG. 6 a schematic cross-sectional illustration of an inlet nozzle according to a first embodiment for use in the device according to the invention.

FIG. 6 shows a schematic cross-sectional illustration of an inlet nozzle 26 according to a first embodiment for use in the device 10. In this case, the illustrated inlet nozzle 26 is arranged in a back wall 60 of the device 10 and connected (not depicted) to a gas source for the process gas, in particular a protective or inert gas, in such a way as to carry the gas flow. The flow direction of the gas flow is illustrated by the black arrows. The inlet nozzle 26 represents an upper inlet nozzle 26, that is, one that is arranged above a lower inlet nozzle 22 (see FIG. 1). The corresponding statement applies also to the inlet nozzles 26 illustrated in FIGS. 7 to 11. It is seen that the upper inlet nozzle 26 comprises a plurality of inlet orifices 42, with the inlet orifices 42 each being separated from one another by a separator wall 44. The incoming gas flow from the gas source is divided in the upper inlet nozzle 26 by the separator walls 44 and carried into separate channels that are thereby formed. In this case, the channels are designed in such a way that the outflow rate at each point of the inlet nozzle 26 is roughly the same. The width of the inlet nozzle 26 is further chosen in such a way that it brings about a flow field that is as homogeneous as possible on the entire construction platform 14. A casing 72 of the inlet nozzle 26 is fixed in place in a corresponding opening of the back wall 60. The casing 72 in the construction chamber 12 widens in a fan shape in the direction of the inlet orifices 42.

Figure 7:
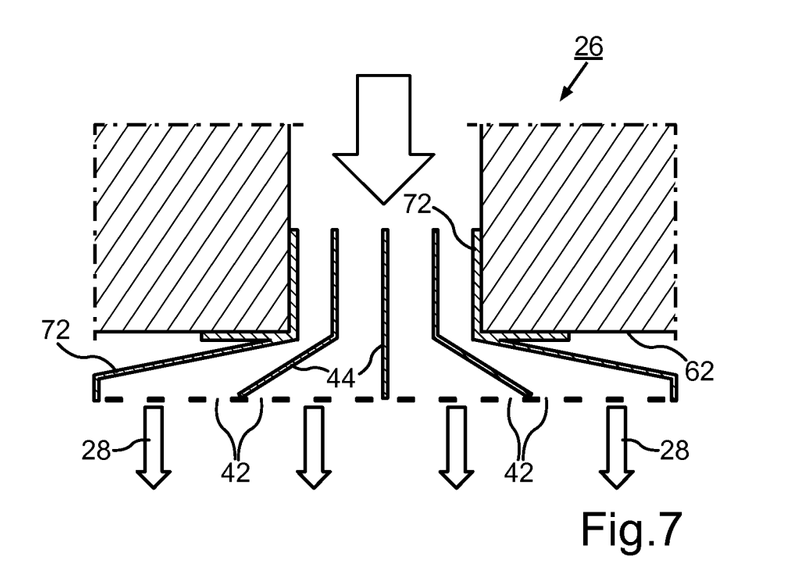
FIG. 7 a schematic cross-sectional illustration of an inlet nozzle according to a second embodiment for use in the device according to the invention.

FIG. 7 shows a schematic cross-sectional illustration of an inlet nozzle 26 according to a second embodiment for use in the device 10. It is seen once again that the incoming gas flow from the gas source is divided by means of the separator walls 44 and diverted into corresponding flow channels. The flow direction of the gas flow is once again indicated by the arrows. In the exemplary embodiment shown here, the inlet nozzle 26 is fixed in place with a portion of its casing 72 in an upper end wall 62 of the construction chamber 12 and connected to the corresponding gas source in such a way as to carry the gas flow (compare also FIG. 1). The casing 72 widens once again in a fan shape in the flow direction into the construction chamber 12. In this case, the inlet orifices 42 are designed and oriented in such a way that the gas flow 28 is diverted in the direction of the construction platform 14.

Figure 8:
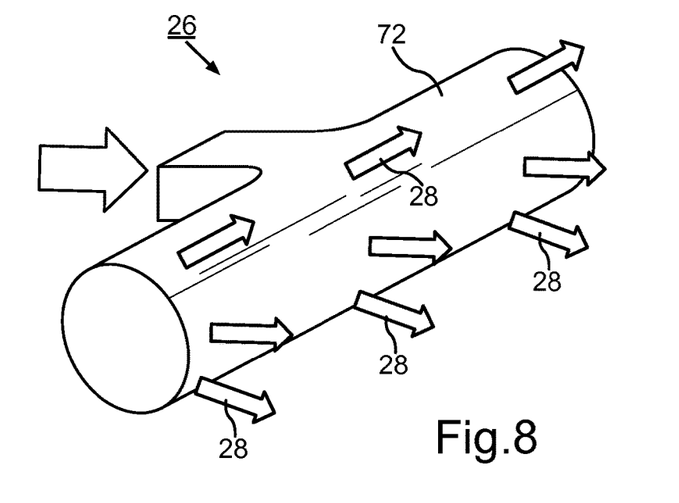
FIG. 8 a schematic illustration of an inlet nozzle according to a third embodiment for use in the device according to the invention.

FIG. 8 shows a schematic illustration of an inlet nozzle 26 according to a third embodiment for use in the device 10. It is seen that the casing 72 is designed to be roughly T-shaped in plan view, with a region of the casing 72 being designed once again so as to be inserted and fixed in place in a corresponding opening of a side wall or upper end wall or the back wall of the construction chamber 12 or the process chamber (see also FIG. 1). The region of the inlet nozzle 26 that projects into the construction chamber 12 is designed in a cylindrical shape and has a plurality of orifices, through which the gas flow 28 is carried in the direction of the construction platform 14 and the corresponding buildup and joining zone 16 of the device 10. The inlet orifices as well as the separator walls formed in the interior of the inlet nozzle 26 are not depicted in FIG. 8. The flow directions are once again indicated by the arrows.

Figure 9:
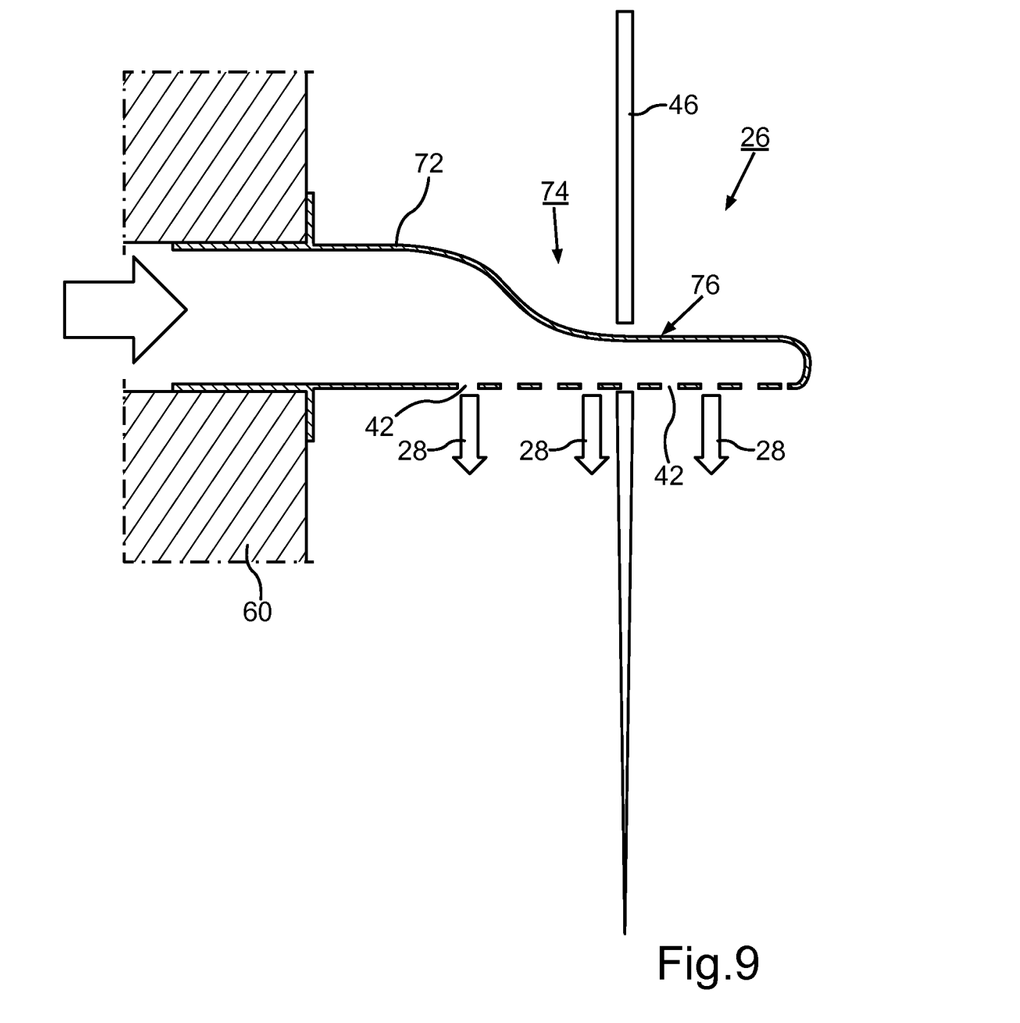
FIG. 9 a schematic, partially cut-away, lateral illustration of an inlet nozzle according to a fourth embodiment for use in the device according to the invention.
Figure 10:
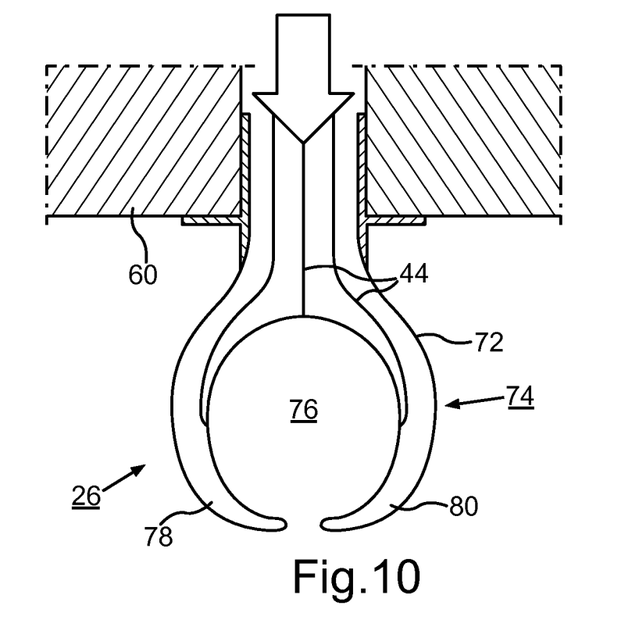
FIG. 10 a schematic cross-sectional illustration of the inlet nozzle according to FIG. 9.
Figure 11:
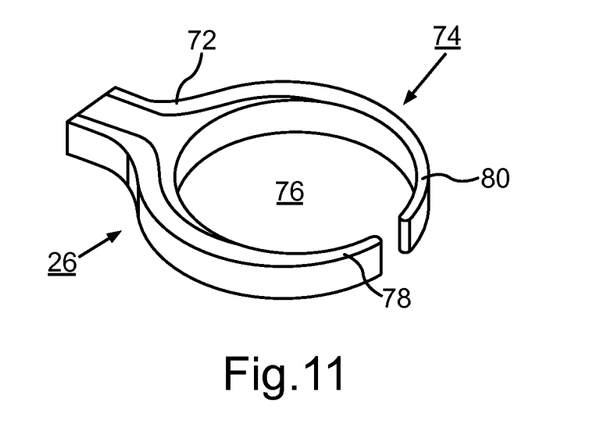
FIG. 11 a schematically illustrated view of the inlet nozzle according to FIG. 9.

FIGS. 9 to 11 show schematic illustrations of an inlet nozzle 26 according to a fourth embodiment for use in the device 10. Shown in FIG. 9 in this case is a schematic, partially cut-away lateral illustration of the inlet nozzle 26. It is seen that, on the one hand, the casing 72 is again fixed in place in an opening of the back wall 60. In addition, the inlet nozzle 26 is once again connected (not depicted) to a gas source for the process gas in such a way as to carry the flow. The flow direction of the gas flow is indicated by the arrows. It is seen that the gas flow 28 is diverted by about 90° inside of the inlet nozzle 26 before its exit from the inlet nozzle 26, so that the gas flow 28 is diverted in the direction of the construction platform 14. Furthermore, it is seen that the portion 74 of the inlet nozzle 26 that projects into the interior of the construction chamber 12 or the process chamber of the device 10 (see FIG. 1) is designed in such a way that a high-energy beam 46, namely a laser beam, can pass through the upper inlet nozzle 26. In FIG. 10, which shows a schematic cross-sectional illustration of the inlet nozzle 26 according to FIG. 9, it is made clear that a passage opening 76 for the laser beam 46 is formed in the region 74 of the inlet nozzle 26. For this purpose, the front section 74 of the inlet nozzle 26 projecting into the construction chamber is formed like a bracket and is roughly circular in shape and comprises two curved arms 78, 80, which surround the passage opening 76. Formed in the interior of the inlet nozzle 26 are once again separator walls 44, which divide the incoming gas flow (see arrow) from the gas source and carry it into corresponding flow channels in the direction of the inlet orifices 42. FIG. 11 shows another schematic illustration of the inlet nozzle 26 according to FIG. 9. The design and form of the inlet nozzle 26 are made clear.

What is claimed is:

1. A device for the manufacture or repair of a three-dimensional object, comprising:
   at least one construction chamber for successive solidification of at least one solidifiable material layer by layer in predefined regions for the layer-by-layer buildup of the three-dimensional object or for layer-by-layer repair of individual regions of the three-dimensional object within the construction chamber, and
   at least one inlet nozzle and at least one suction nozzle for a process gas, with the inlet nozzle and the suction nozzle being arranged where a gas flow that passes at least partially over a buildup and joining zone of a construction platform formed in the construction chamber is created,
   wherein the ratio of the sums of the fluid-dynamically relevant cross-sectional areas of the at least one suction nozzle to the at least one inlet nozzle is 2.5:1 to 0.3:1, and
   wherein the at least one suction nozzle comprises at least two suction orifices, wherein said at least two suction orifices are each connected to an associated suction channel in such a way as to carry the flow, and each suction channel has wall surfaces that have a contoured course that is curved at least in sections in the flow direction and the associated suction channels are separated from one another.

2. The device according to claim 1, wherein the ratio of the sums of the fluid-dynamically relevant cross-sectional areas of the at least one suction nozzle to the at least one inlet nozzle is 1.3:1 to 0.7:1.

3. The device according to claim 1, wherein the at least one suction nozzle and the at least one inlet nozzle are configured where the ratio of the effective flow rates of the at least one suction nozzle to the at least one inlet nozzle is 2.5:1 to 0.3:1.

4. The device according to claim 3, wherein the ratio of the effective flow rates of the at least one suction nozzle to the at least one inlet nozzle is 1.3:1 to 0.7:1.

5. The device according to claim 1, wherein the suction channels are configured and dimensioned where a roughly equivalent gas volume flow passes through each suction channel.

6. The device according to claim 1, wherein the suction channel is configured where the suctioned gas flow is diverted in a plane above and/or below the suction orifice.

7. The device according to claim 1, wherein at least one cover is arranged on a subregion of the suction orifices for reduction of the fluid-dynamically relevant cross-sectional area.

8. The device according to claim 1, wherein the device comprises at least one upper inlet nozzle arranged in an upper region lying opposite the construction platform and/or in a side wall of the device, and/or at least one lower inlet nozzle arranged in a side wall of the device above the construction platform and below the upper inlet nozzle.

9. The device according to claim 8, wherein the upper inlet nozzle comprises at least two inlet orifices, wherein the inlet orifices are separated from one another by at least one separator wall.

10. The device according to claim 9, wherein the inlet orifices are configured and oriented where a gas flow is diverted in the direction of the construction platform.

11. The device according to claim 8, wherein the upper inlet nozzle has at least one passage opening for a high-energy beam selected from the group of a laser beam, electron beam, and a UV light beam.

* * * * *